W. G. WILSON.
REFRIGERATOR.
APPLICATION FILED MAY 17, 1909.
980,724.
Patented Jan. 3, 1911.
2 SHEETS—SHEET 1.
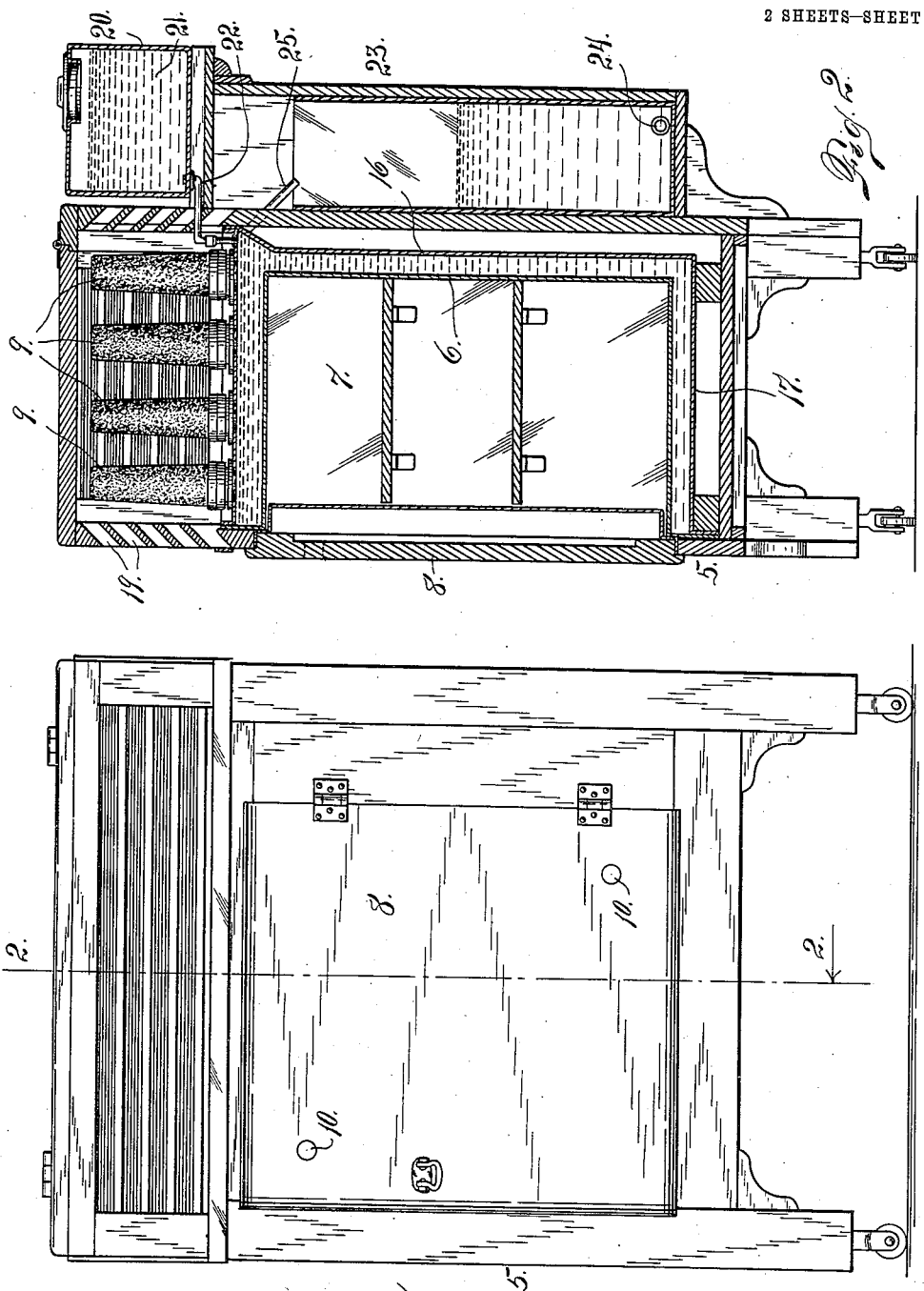

UNITED STATES PATENT OFFICE.

WYLIE G. WILSON, OF DENVER, COLORADO.

REFRIGERATOR.

980,724.

Specification of Letters Patent.

Patented Jan. 3, 1911.

Application filed May 17, 1909. Serial No. 496,559.

*To all whom it may concern:*

Be it known that I, WYLIE G. WILSON, a subject of Great Britain, residing in the city and county of Denver and State of Colorado, have invented certain new and useful Improvements in Refrigerators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in refrigerators of the general class in which the cooling function is accomplished by evaporation. In my present invention, however, at least in the preferred form thereof, I employ a series of hollow porous bodies mounted above the chamber to be cooled, the latter being surrounded by a jacket in communication with the lower extremities of the hollow porous bodies. When the apparatus is in use, water is delivered to the said jacket until the latter is full and until it rises within the porous bodies and preferably fills the same. These porous bodies are located in a chamber open to the circulation of atmospheric air therethrough from the outside, whereby the evaporation of the liquid which passes through the porous bodies and collects upon the outside thereof, is facilitated. This evaporation of the liquid from the outside of the porous bodies, results in cooling the liquid within the said bodies and causes the liquid to pass downwardly into the jacket, the warmer water rising within the porous bodies and in turn becomes cooled and moves downwardly. By virtue of this construction and arrangement, it may be assumed that there is a vertical circulation of water between the jacket surrounding the cooling chamber and the interior of the hollow porous bodies, whereby the water surrounding the refrigerator chamber is kept cool and at a temperature sufficiently low to produce the required or necessary results within the said chamber.

Having briefly outlined my improved construction, I will proceed to describe the same in detail, reference being made to the accompanying drawing in which is illustrated an embodiment thereof.

Figure 3:
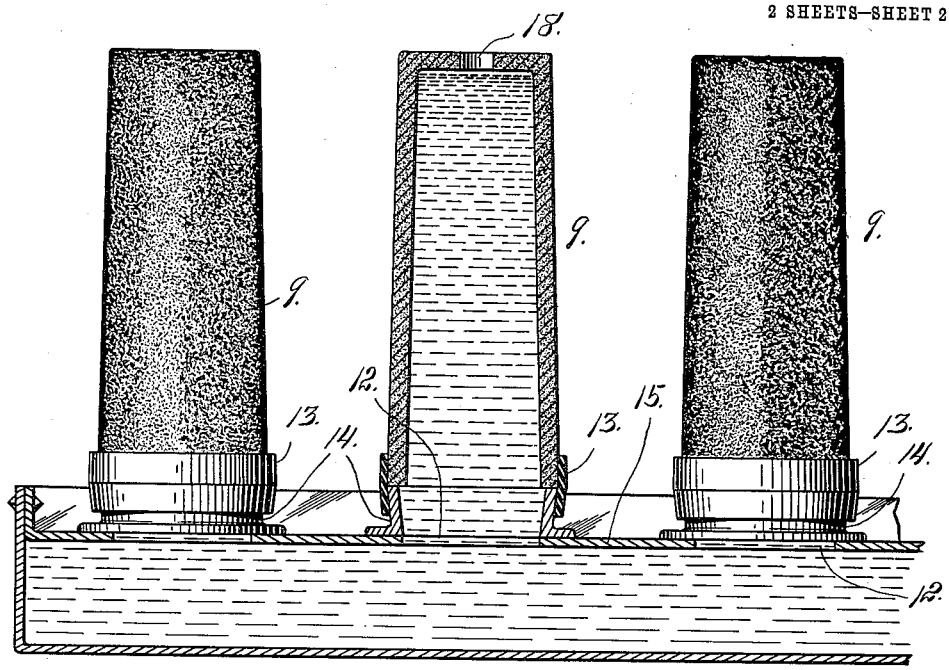
Figure 4:
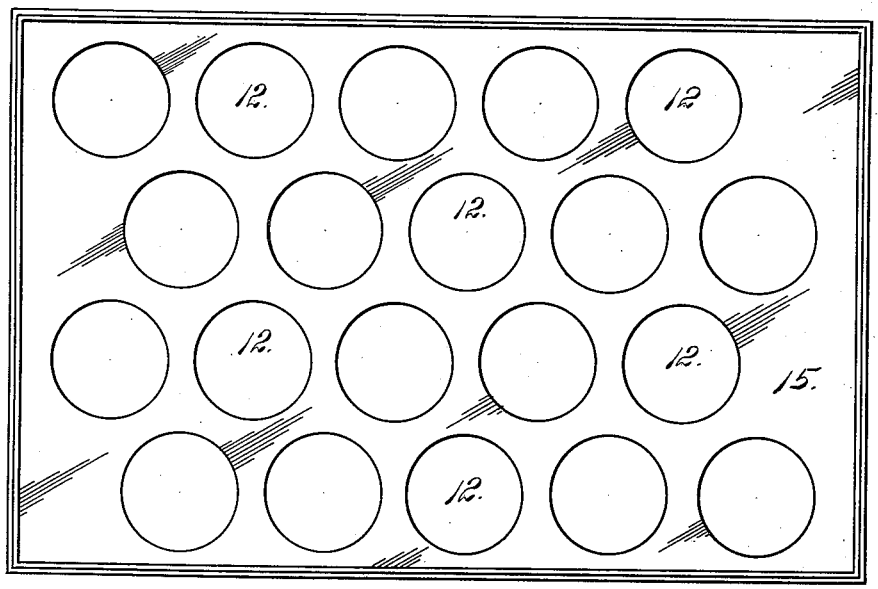

In this drawing, Figure 1 is a front elevation of a refrigerator equipped with my improvements. Fig. 2 is a vertical section of the same taken on the line 2—2, Fig. 1. Fig. 3 is a fragmentary section taken through the air circulating chamber containing the hollow porous bodies, showing the upper part of the water jacket surrounding the refrigerating chamber. In this view, one of the porous bodies is shown in vertical section and the others in elevation. Fig. 4 is a top plan view of the top of the refrigerator illustrating the openings to which the porous bodies may be applied.

The same reference characters indicate the same parts in all the views.

Let the numeral 5 designate the refrigerator having a water jacket 6, surrounding the refrigerating chamber 7. This jacket as illustrated in the drawing, surrounds the refrigerator chamber except on the front side where the door is located. Above the refrigerator chamber and in communication therewith is a number of hollow porous bodies 9, which are placed over openings 12 formed in the bottom of a pan 15 constituting the upper member of the top wall of the refrigerator. These hollow porous bodies, are connected with collars 14 surrounding the openings 12, by elastic bands 13 which extend around the lower extremities of the porous bodies overlapping the same as well as the collar 14 upon which the porous bodies rest. The outer side plate of the water jacket is designated 16 and its outer bottom plate 17.

The upper chamber in which the porous bodies 9 are located, is surrounded by walls having inclined slots 19 through which the air circulates freely causing the water which accumulates upon the outer walls of the porous bodies to be rapidly evaporated causing the water to be quickly cooled, whereby it automatically descends into the jacket surrounding the cooling chamber and maintains the latter at a sufficiently low temperature for refrigerating purposes.

Mounted in the rear of the refrigerator is a receptacle 20 containing water 21. This receptacle 20, is in communication with the water jacket by means of a pipe 22, whereby the jacket may be filled with water, after which the latter rises within the hollow porous bodies and fills the same.

In case there is an accumulation of water in the pan 15 due to the passage of a surplus through the porous bodies, this water will escape through an outlet pipe 25 into a rearwardly located tank 23 having a drain outlet 24.

When the apparatus is in use, the jacket 6 together with the hollow porous bodies is kept supplied with water from the tank 20, the water after filling the jacket, rising within the porous bodies to a depth equal to the height of the source of supply. The water immediately begins to seep through the porous bodies and passes to the outside thereof, where it is evaporated by the circulation of air through the chamber in which the said bodies are located. This evaporation cools the water within the porous bodies and causes the latter to descend into the jacket, the warmer water rising from the jacket to take the place of the cold water which naturally descends, thus producing a circulation between the porous bodies and the jacket below. In this manner, the refrigerator chamber is kept surrounded by water at a sufficiently low temperature to properly perform the cooling function.

In order to make the porous bodies 9 less frangible, and at the same time increase the porous surface thereof, the upper extremities of these porous bodies are closed except for orifices 18, which allow the air to escape as the said bodies are filling with liquid from below, thus preventing the cushioning of the air within the said bodies.

The walls of the water jacket surrounding the refrigerator chamber 7 are preferably composed of metal.

Having thus described my invention, what I claim is:

1. A refrigerator having a water jacket in contact with the wall of the refrigerator chamber, the water jacket having openings in the top thereof, hollow porous bodies mounted above the jacket and in communication with the openings, and elastic bands for forming a water-tight joint between the porous bodies and the water jacket, the said porous bodies being exposed to the air to facilitate evaporation.

2. A refrigerator having a water jacketed wall provided with openings in its upper part, collars surrounding the opening, hollow porous bodies mounted on the collars and in communication with the water jacket, whereby after the jacket is filled with water, the latter will rise in the porous bodies and seep through the walls thereof, and means for exposing the exterior surfaces of the porous bodies to the circulation of air to facilitate evaporation, substantially as described.

3. A refrigerator having water jacketed walls, porous receptacles mounted above the refrigerating chamber and in communication with the jacket thereof, and means for filling the said jacket with liquid, whereby the latter is caused to rise within the porous bodies, and a casing also mounted above the refrigerating chamber and inclosing the said bodies, the said casing having walls provided with inclined slots to permit the circulation of air for the purpose set forth.

4. A refrigerator having its refrigerating chamber provided with water jacketed walls, the upper member of the wall at the top of the jacket having openings, porous receptacles surrounding said openings and elastic bands for forming a liquid tight seal around the lower extremities of the said receptacles.

5. A refrigerator whose refrigerating chamber is inclosed by water jacketed walls, the upper member of the jacket at the top having openings, collars surrounding the said openings, porous receptacles extending above the collars, and means for forming a liquid tight joint between the collars and the said receptacles, substantially as described.

6. A refrigerator having a water jacketed wall, a pan at the top of the jacket and having openings communicating therewith, porous receptacles in communication with the said openings, a filling tank in communication with the jacket, and a drain tank in communication with the said pan for removing the drip from the exterior surface of the porous bodies, substantially as described.

7. A refrigerator having a water jacketed wall, a pan at the top of the jacket having openings communicating with the latter, porous receptacles, in communication with the said openings, the upper extremities of said receptacles having restricted openings, a filling tank in communication with the jacket below the bodies, said filling tank being sufficiently elevated to cause the water to rise within the porous bodies substantially as described.

8. A refrigerator having a water jacketed wall, a series of porous receptacles mounted above the jacket and in communication with the top thereof, a pan surrounding the said receptacles and adapted to receive the drip from the outer surface thereof, a drain tank mounted on the refrigerator and a pipe leading from the said pan to the said tank for the purpose set forth.

In testimony whereof I affix my signature in presence of two witnesses.

WYLIE G. WILSON.

Witnesses:
JESSIE HOBART,
A. EBERT O'BRIEN.